Figure 1:
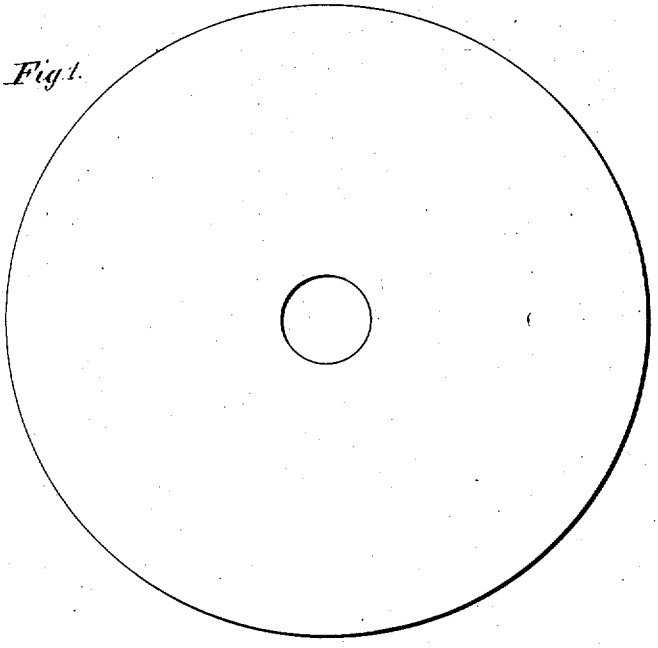
Figure 2:
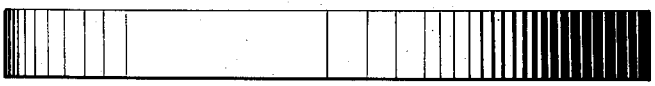

G. E. Vanderburgh,
Emery Wheel.

No. 2,501. Reissued Mar. 5, 1867.

Witnesses:
Randolph Lyon Jr.
F. W. Symons.

Inventor:
Geo. E. Vanderburgh
By his attorney
Z. C. Robbins

United States Patent Office.

THE NEW YORK QUARTZ COMPANY, OF NEW YORK, N. Y., ASSIGNEES BY MESNE ASSIGNMENTS OF GEORGE E. VAN DERBURGH.

*Letters Patent No.* 34,123, *dated January* 7, 1862; *reissue No.* 2,501, *dated March* 5, 1867.

IMPROVEMENT IN FORMING EMERY-WHEELS, AND GRINDING AND POLISHING SURFACES.

The Schedule referred to in these Letters Patent and making part of the same.

TO ALL WHOM IT MAY CONCERN:

Be it known that I GEORGE E. VAN DERBURGH, of New York city, in the county and State of New York, (late of Mamaroneck in said State,) have invented a new and useful Method of Producing Artificial Stone for Grinding and other Purposes; that I did obtain Letters Patent of the United States for the same, bearing date the seventh day of January, 1862, that the specification of my said invention was defective, and that I do therefore now make and declare the following to be a full and exact description of said invention.

The object of my invention is the production of emery-wheels, whet-stones, &c., by the combination of particles of emery, corundum, Franklinite, or glass, in a suitably comminuted state, or of sand-stone, buhr-stone, or other sharp, gritty material. And my said invention consists in employing an alkaline silicate, or other material capable of vitrifaction at a comparatively low temperature, as a flux or cementing material to unite by its vitrifaction any suitable gritty and cutting substances into an artificial stone or solid mass.

The process of manufacturing my improved artificial stone for grinding and cutting purposes is as follows: The emery, corundum, or other gritty or cutting material to form the body of the stone, having been first ground to the fineness desired in its texture, is thoroughly incorporated with a vitrescent alkaline silicate, such as the "water-glass" of commerce, or the liquid silicate produced by the formula specified in the Letters Patent granted to me on the 29th day of November, 1860, in such proportion as to produce a pasty or plastic mass. This plastic mass is then moulded or formed into any desired shape, either with or without pressure, the effect of the application of pressure being to produce a greater condensation of the stone. Where it is desirable to use crystals of silicate, or silicate which has become hard and dry, it is first reduced to powder and dissolved, and thereafter used as above specified, or such crystallized silicate may be mixed with the gritty particles in a dry state, and the mass be afterward brought to a proper plastic condition with water. The proportion of dry silicate and of gritty particles should be about one part of powdered silica to four parts of emery or its equivalent. After the plastic mass of emery and silica has been properly moulded, the articles produced are first thoroughly dried by exposure to a comparatively low temperature, say from 100° to 150°, and are then submitted for two or three hours to a more intense curing or toughening temperature, which must be high enough to produce a vitrifaction of the alkaline silicate used as a flux, (say about 1,800° or a dull red heat,) and yet not be sufficiently intense to affect or impair the cutting properties of the gritty portion of said articles. In this connection I would observe that I have myself produced the best results by employing a sand-bath as the medium of communicating the proper degree of curing and toughening heat to the said moulded articles, and that I also prefer to exclude air from the oven or chamber in which the articles are baked or cured.

Having thus fully described my invention, what I claim as new, and desire to secure by Letters Patent, is—

1. The combination of particles of emery or other gritty or cutting materials into an artificial stone or substance for grinding, polishing, and other purposes, by the vitrifaction or partial vitrifaction of any suitable vitrescent flux, previously intermingled with said particles, all substantially in the manner herein set forth.

2. The combination of sand or particles of emery, ground glass, or any other suitable gritty or cutting particles, with an alkaline silicate or other vitrescent flux, for the purpose of producing an artificial grinding and polishing stone, by the vitrifaction of said flux under the influence of heat, substantially in the manner herein set forth.

3. I claim also curing and hardening a plastic combination of gritty particles with a vitrescible flux, by first subjecting the same to a moderate heat until dry, and afterwards to the action of a higher temperature, until a partial or entire vitrifaction of the flux is produced, substantially in the manner herein set forth.

Witness my hand to this specification this fourth day of January, A. D. 1867.

GEORGE E. VAN DERBURGH,

In the presence of—
GEO. A. MAYHEW,
JNO. T. SNOOK.